No. 766,289. PATENTED AUG. 2, 1904.
A. SCHWARZ.
PROCESS OF SEPARATION.
APPLICATION FILED AUG. 19, 1903.
NO MODEL.
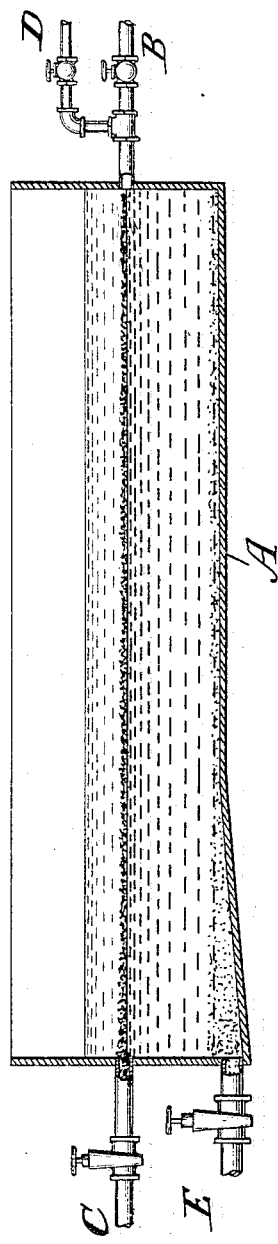
WITNESSES:
INVENTOR
Alfred Schwarz
BY
his ATTORNEYS No. 766,289.          Patented August 2, 1904.

UNITED STATES PATENT OFFICE.

ALFRED SCHWARZ, OF NEW YORK, N. Y., ASSIGNOR TO CHARLES N. LINDLEY, INDIVIDUALLY AND AS TRUSTEE, OF NEW YORK, N. Y.

PROCESS OF SEPARATION.

SPECIFICATION forming part of Letters Patent No. 766,289, dated August 2, 1904.

Application filed August 19, 1903. Serial No. 170,057. (No specimens.)

*To all whom it may concern:*

Be it known that I, ALFRED SCHWARZ, a subject of the Emperor of Germany, residing in the borough of Manhattan, in the city, county, and State of New York, have invented a certain new and useful Process of Separation, of which the following is a specification, reference being had to the accompanying drawing, forming a part thereof.

My invention relates to improvements in processes for separating different materials, and is particularly applicable to concentrating or separating the metalliferous portions of ore from the gangue or non-metalliferous portions.

My invention consists in a novel process in which the material to be separated is subjected to the action of a plurality of liquids of different specific gravities floating upon each other and not soluble in each other. For purposes of simplicity of description I will refer to the use of two liquids one superposed upon the other, but in so doing in no wise desire to limit myself to the use only of two such liquids. It is essential, first, that the liquids be of different specific gravity to each other, and, second, that they will not mix or dissolve in each other, and for many purposes it is further desirable that their physical qualities be so different that they will act differently upon different materials to be treated. For instance, the lower liquid may be water or a saturated saline solution and the upper liquid oil, preferably a vegetable oil the specific gravity of which would not be much more than one-half that of the saline solution. The physical qualities of the saline solution are such that it may be absorbed by porous material coming in contact therewith, while such material may have but a slight attraction for oil, while other material, perhaps of a non-absorbent quality, may have such an attraction for the oil as to become readily coated thereby and in such a condition will be but very slightly affected by the saline solution. While preserving the first two essentials, however, the exact liquids employed will depend upon the material desired to be separated. The material to be separated will either differ in specific gravity or will be differently affected by the different liquids to which it is to be subjected in the separating process. Materials of many and varied kinds may be separated, and for purposes of this description I will refer to the separation of the sulfids of copper and iron from silicious material contained in their ore. The silicious material is somewhat porous, and the material as a whole treated with water or a saline solution will absorb a certain quantity thereof, and the particles will have a greater weight for their bulk than before such treatment. The sulfids of copper or iron being practically non-absorbent will not be affected by the water or saline solution, and their weight for bulk will not be appreciably changed.

In carrying out my process, therefore, in separating the said metal sulfids from their gangue I first moisten or wet the material in a crushed or pulverulent condition as a whole with water or a saline solution and then immerse the whole quietly and without agitation in a bath comprising liquids of different specific gravities, such as oil floating upon a saturated saline solution, as aforesaid. The particles of silicious material having absorbed moisture or being in themselves of greater specific gravity than the metal sulfids and, further, being not physically attracted by the oil will pass through the oil into the saline solution and will fall thence to the bottom of the vessel. The silicious material being of greater specific gravity than the saline solution will pass freely therethrough once it is immersed therein, because having already been wet or moistened with a similar material the fact that it may be spongy or porous, and hence have a physical weight for its size which would otherwise tend to cause it to float, will no longer have such tendency, the porous or spongy portions of the material being already filled with a liquid equivalent to the liquid into which it falls. The same fact will, however, cause it to pass still more rapidly through the oil, because the physical weight with reference to its bulk will cause it not only by weight to so fall through the oil, but the water or saline solution carried thereby will tend to repel the oil, and hence assist it to fall easily therethrough. On the other hand, the metal sulfids being non-porous or non-absorbent will not take up any of the water or saline solution in which they are first immersed and when immersed in the oil will tend to become coated therewith, so that each grain or particle is likely to be enveloped by a fine coating or film of oil. Such particles as have a less specific gravity of themselves than the saline solution, and such particles will be largely in predominance, will fall slowly through the oil or will float upon the oil or will remain in suspension in the oil, but will not pass the upper level of the water. The greater portion of them will form a film lying between the oil and water. Some portions or even all of the material to be separated may, however, have a specific gravity somewhat greater than that of the lower liquid; but in this case, provided they have such a physical attraction for the upper liquid, the fine film or coating of this liquid around them will prevent them passing out of the zone of the upper liquid into the lower. The material having been immersed quietly and without agitation there will be no tendency for these particles to break away from the liquid adhering thereto and having no downward impedance will not tend to break through the dividing-line between the two liquids. The upper liquid in enveloping the particles will practically add a greater proportion of bulk than it will weight, and hence will tend to hold these particles back and prevent their falling into the lower liquid. The metal sulfids or other material thus separated and remaining in the upper liquid or floating upon the lower liquid may be collected and removed in any desired manner, while the material falling to the bottom of the vessel may also be drawn off or collected, as desired.

For the purpose of making the process a continuous one I preferably supply the vessel continuously with materials to be treated and the liquids employed in the treatment thereof and provide for continuously conveying away the separated material. With this object in view I continuously supply liquid to the vessel at about the upper level of the lower liquid at one end of the vessel and continuously draw off the material contained in the upper liquid at about a similar point at the opposite end of the vessel. I may also continuously draw off the material falling to the bottom of the vessel or may draw same off from time to time, as it may be necessary. I supply a sufficient quantity of both the liquids to compensate for that drawn off with the material thus collected, and by supplying this liquid at one end of the vessel at about the level of the material to be drawn off and discharging the said material at a similar point at the opposite end of the vessel I produce such a current in the liquid as will set up the most favorable conditions for so drawing the material off.

In the drawing the figure shows a conventional view of an apparatus in longitudinal vertical section in which my improved process may be carried out.

The apparatus comprises a vessel A, having at one end a supply B for the lower liquid and at the opposite end a discharge C at about the same level for the concentrates. An admission for the upper liquid is shown at D, which admission may be at any suitable point, and at E, I have shown means for conveying away the material which falls to the bottom of the vessel.

What I claim is—

1. The herein-described process of separating different materials by the selective action of two liquids of different specific gravities, which consists in introducing the materials in a granular or pulverulent condition, quietly, without downward impetus, and without agitation, into a bath of oil floating upon water.

2. The herein-described process of separating different materials by the selective action of two liquids of different specific gravities, which consists in introducing the materials in a granular or pulverulent condition, quietly, without downward impetus, and without agitation, into a bath of oil floating upon water in which salt is held in solution.

3. The herein-described method of separating the metalliferous portions of ore from the gangue or non-metalliferous portions by the action of two liquids of different specific gravities, which consists in first absorbing in the non-metalliferous portions a liquid heavier than the lighter of two separating liquids, and which will not be replaced therein by the said lighter liquid, and then introducing the mixture, without agitation, into the lighter of the said separating liquids in a bath comprising the two liquids, one floating upon the other, the specific gravities of the separating liquids bearing such relation to the ore as to retain the metalliferous portions in the lighter liquid and to permit the non-metalliferous portions to pass into the heavier liquid.

4. The herein-described method of separating two classes of materials by the selective action of two liquids of different specific gravities, which consists in first increasing the physical weight of one of the materials by absorbing therein a liquid heavier than the lighter of the said separating liquids, and which will not be replaced therein by the said lighter liquid, and then introducing the materials, without agitation, into the lighter of the said separating liquids, in a bath comprising the two liquids, one floating upon the other, the said lighter liquid being one which has a greater physical attraction for that portion of the material in which the heavier liquid has not been absorbed than that portion in which the said liquid has been absorbed, such physical attraction causing the liquid to adhere thereto, whereby the two materials will be separated, one falling into the heavier liquid and the other being retained by the lighter liquid.

5. The herein-described method of separating the metalliferous portions of ore from the gangue on non-metalliferous portions by the selective action of two liquids of different specific gravities, insoluble in each other, which consists in first absorbing in the non-metalliferous portions the heavier of the two separating liquids and before bringing it into contact with the lighter of the two said liquids, and then introducing the mixture, without agitation, into the lighter of the said separating liquids in a bath comprising the two liquids, one floating upon the other, the said lighter liquid being one which has such physical attraction for the metalliferous portions of the ore as to cause it to adhere thereto and hold the same from passing into the heavier liquid, but whose physical attraction for the non-metalliferous portions in which the heavier liquid has been absorbed will not be sufficient to hold same, whereby the non-metalliferous portions will pass into the heavier liquid.

6. The herein-described process of separating different materials by the selective action of two liquids of different specific gravities, insoluble in each other, which consists in first moistening the materials in a granular or pulverulent condition with water only, and then introducing the material so moistened, and without agitation, into oil in a bath comprising oil floating upon water.

7. The herein-described process of separating different materials by the selective action of two liquids of different specific gravities, insoluble in each other, which consists in first moistening the materials in a granular or pulverulent condition with water only, and then introducing the material so moistened, and without agitation, into oil in a bath comprising oil floating upon water holding salt therein in solution.

In witness whereof I have hereunto set my hand this 18th day of August, 1903.

ALFRED SCHWARZ.

Witnesses:
D. HOWARD HAYWOOD,
MINERVA POPE.